(12) United States Patent
Jang et al.

(10) Patent No.: US 12,027,712 B2
(45) Date of Patent: Jul. 2, 2024

(54) FLEXIBLE BATTERY AND METHOD FOR FORMING PATTERN OF FLEXIBLE BATTERY

(71) Applicant: AMOGREENTECH CO., LTD., Gimpo-si (KR)

(72) Inventors: Ju Hee Jang, Uijeongbu-si (KR); Hyeon Woo Cho, Cheonan-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 694 days.

(21) Appl. No.: 17/251,505

(22) PCT Filed: Jun. 17, 2019

(86) PCT No.: PCT/KR2019/007264
§ 371 (c)(1),
(2) Date: Dec. 11, 2020

(87) PCT Pub. No.: WO2019/240557
PCT Pub. Date: Dec. 19, 2019

(65) Prior Publication Data
US 2021/0249719 A1    Aug. 12, 2021

(30) Foreign Application Priority Data

Jun. 15, 2018   (KR) ................. 10-2018-0069082
Jun. 14, 2019   (KR) ................. 10-2019-0070437

(51) Int. Cl.
*H01M 50/136*   (2021.01)
*H01M 10/0585*   (2010.01)
(Continued)

(52) U.S. Cl.
CPC ..... *H01M 50/136* (2021.01); *H01M 10/0585* (2013.01); *H01M 50/102* (2021.01); *H01M 50/105* (2021.01)

(58) Field of Classification Search
CPC .... Y02E 60/10; Y02P 70/50; H01M 10/0585; H01M 2220/30; H01M 50/102; H01M 50/105; H01M 50/136; H01M 50/184
See application file for complete search history.

(56) References Cited

U.S. PATENT DOCUMENTS 10,090,556 B2    10/2018    Rho et al.
10,164,288 B2    12/2018    Rho et al.
(Continued)

FOREIGN PATENT DOCUMENTS

JP    2015038868 A    2/2015
JP    2017157556 A    9/2017
(Continued)

OTHER PUBLICATIONS

Machine translation KR20160029705A (Year: 2016).*
International Search Report cited in PCT/KR2019/007264 dated Oct. 4, 2019, 4 pages.

*Primary Examiner* — Victoria H Lynch
(74) *Attorney, Agent, or Firm* — ROTHWELL, FIGG, ERNST & MANBECK, P.C.

(57) ABSTRACT

A flexible battery is provided. A flexible battery according to an embodiment of the present invention comprises: an electrode assembly; an exterior material for sealing the electrode assembly together with an electrolyte; and a plurality of patterns having ridge portions and groove portions repeatedly formed along the lengthwise direction, wherein the maximum bending curvature at which the battery can be bent through the plurality of patterns is adjusted through the gap (L) between two neighboring patterns and the depth (d) of the patterns.

5 Claims, 4 Drawing Sheets (51) Int. Cl.
*H01M 50/102* (2021.01)
*H01M 50/105* (2021.01)

(56) References Cited

U.S. PATENT DOCUMENTS

| | | |
|---|---|---|
| 2014/0079979 A1 | 3/2014 | Kwon et al. |
| 2015/0022957 A1 | 1/2015 | Hiroki et al. |
| 2015/0349375 A1* | 12/2015 | Takahashi .............. H01G 9/048 |
| 2017/0250383 A1 | 8/2017 | Goto et al. |

FOREIGN PATENT DOCUMENTS

| | | | | |
|---|---|---|---|---|
| KR | 20140035689 A | | 3/2014 | |
| KR | 20160028988 A | | 3/2016 | |
| KR | 20160029705 A | * | 3/2016 | ............ H01M 10/04 |
| KR | 20160029705 A | | 3/2016 | |
| KR | 20160089105 A | | 7/2016 | |

\* cited by examiner

FLEXIBLE BATTERY AND METHOD FOR FORMING PATTERN OF FLEXIBLE BATTERY

CROSS REFERENCE TO RELATED APPLICATION

This application is a 35 U.S.C. 371 National Phase Entry Application from PCT/KR2019/007265, filed Jun. 17, 2019, which claims the benefit of Korean Patent Application Nos. 10-2018-0069082 filed on Jun. 15, 2018 and 10-2019-0070437 filed on Jun. 14, 2019, the disclosures of which are incorporated herein in their entirety by reference.

TECHNICAL FIELD

The present invention relates to a flexible battery and a method of forming a pattern of the flexible battery.

BACKGROUND

Recently, interest in flexible batteries applicable to electronic products such as a rolled display, a wireless headphone, and the like has increased.

Compared to other batteries such as a nickel-cadmium battery, a nickel-hydrogen battery, a nickel-zinc battery, and the like, the flexible battery can be implemented to have high energy density per unit weight and a light weight, and can be quickly charged and thus utilization is excellent.

As a part of that, a pouch-type battery which seals an electrode assembly including a negative electrode, a positive electrode, and a separator, and an electrolyte along with an exterior material has been developed.

Such a pouch-type battery has advantages in that an exterior material is manufactured from a flexible material and thus the pouch-type battery can be manufactured in various forms, and high energy density per mass can be realized.

However, since the exterior material and the electrode assembly are damaged by contraction and relaxation when repeated bending occurs, or the performance in a bent state is significantly degraded compared to an initial design value, a conventional pouch-type battery have limitations in functioning as a battery.

As a solution to this, a method of preventing damage during bending and reducing performance degradation by forming a pattern on an exterior material has been disclosed. However, when the pattern is formed only on the exterior material, the bending can be performed only in an extremely limited range, and when the bending exceeds an allowable curvature range, damage occurs and there is a problem in that the battery cannot function.

Accordingly, when the flexible battery is applied to curved portions with a predetermined curvature in products including the curved portions with the predetermined curvature, such as fixing bands of a headset and a virtual reality (VR) device, the flexible battery can be applied only within an allowable curvature range, and thus has limitation of application to actual products.

Further, in the products including the curved portions with the predetermined curvature, such as the fixing bands of a headset and a VR device, since the curved portions where the flexible battery is mounted are different, and allowable curvature ranges are different, it is necessary to design to have a curvature range suitable for each product.

SUMMARY OF THE DISCLOSURE

As a result of the above-described repeated studies and experiments, the present inventors discovered a case in which an allowable maximum bending curvature of a flexible battery during bending is related to a gap between patterns and the depth of the pattern in a case in which the flexible battery includes the patterns for contraction and relaxation during bending, and thus have completed the present invention.

That is, a case in which the flexible battery including the patterns for contraction and relaxation during bending has the same maximum bending curvature even when an overall thickness increases or a width increases when the gap between the patterns and the depth of the pattern are set to have the same value regardless of the overall thickness and the width has been obtained through the repeated studies and experiments.

The present invention is directed to providing a flexible battery capable of realizing a maximum bending curvature which is always the same regardless of the overall thickness and the width and a method of forming patterns of the flexible battery.

One aspect of the present invention provides a flexible battery including: an electrode assembly: an exterior material configured to seal the electrode assembly along with an electrolyte: and a plurality of patterns having ridge portions and groove portions repeatedly formed along a lengthwise direction, wherein a maximum bending curvature where the flexible battery is curved through the plurality of patterns during bending is adjusted through a gap (L) between two neighboring patterns and a depth (d) of the pattern.

Further, the gap (L) between the two neighboring patterns may be a gap between two neighboring ridge portions or a gap between two neighboring groove portions, and the depth (d) of the pattern may be a height difference between the ridge portion and the groove portion formed on the same surface.

In this case, an overall thickness of the flexible battery may be a distance between the ridge portion and the ridge portion protruding in opposite directions with respect to a virtual center line.

Further, the plurality of patterns may include a first pattern formed on the electrode assembly and a second pattern formed on the exterior material so as to match the first pattern.

In addition, the plurality of patterns may be formed over an entire length of the flexible battery or partially formed over a part of the entire length of the flexible battery.

In addition, a radius of curvature at the maximum bending curvature may range from R20 to R95.

In addition, the maximum bending curvature may be a curvature where a portion formed with the plurality of patterns among an entire length of the flexible battery is maximally curved by bending.

Meanwhile, another aspect of the present invention provides a method of forming patterns of a flexible battery to allow the flexible battery to be curved with a predetermined curvature through the plurality of patterns in which ridge portions and groove portions are repeatedly formed along a lengthwise direction during bending, wherein a gap (L) between two neighboring patterns and a depth (d) of the pattern are adjusted in the plurality of patterns so that a maximum bending curvature where the flexible battery is curved through the plurality of patterns during bending is adjusted.

According to the present invention, flexible batteries having the same maximum bending curvature can be repeatedly implemented regardless of an overall thickness and a width by adjusting a gap between two neighboring patterns and a forming depth of the pattern. Accordingly, according to the present invention, the flexible batteries can be implemented in various shapes to meet required design conditions regardless of overall sizes.

DETAILED DESCRIPTION

Hereinafter, exemplary embodiments of the present invention will be described in detail with reference to the accompanying drawings which may allow one of ordinary skill in the art to easily carry out the present invention. The present invention may be implemented in various forms and is not limited to the following embodiments. Components not related to the description are not included in the drawings to clearly describe the present invention, and the same reference symbols are used for the same or similar components in the description.

Figure 1:
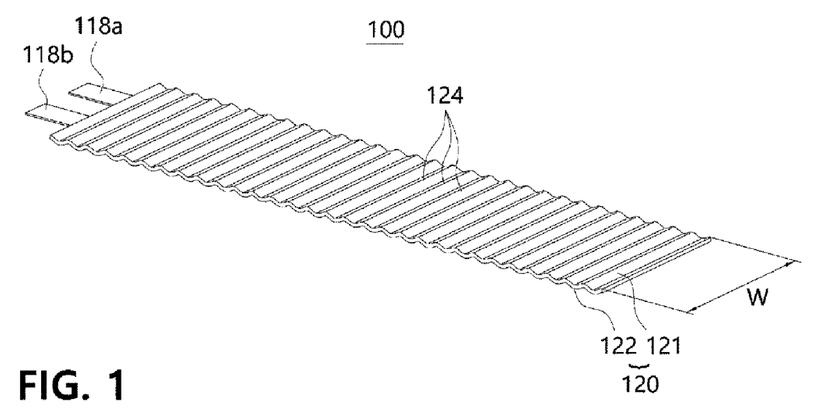
FIG. 1 is an overall schematic view illustrating a flexible battery according to one embodiment of the present invention.
Figure 2:
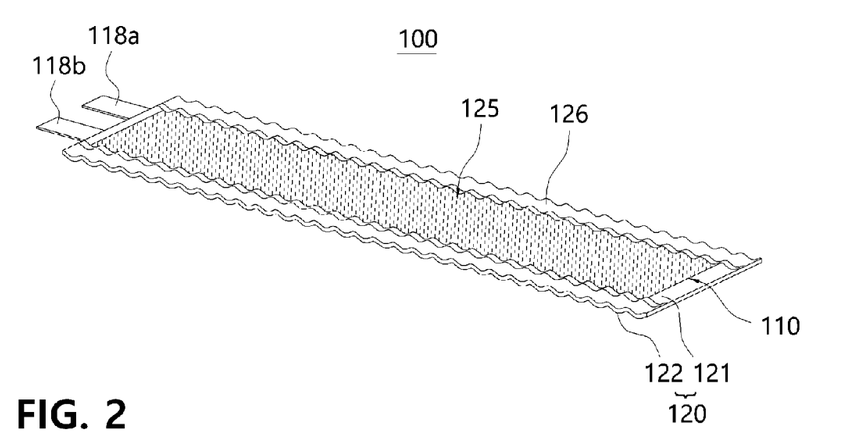
FIG. 2 is a schematic view illustrating a state in which an electrode assembly is accommodated in an exterior material in FIG. 1.

As shown in FIGS. 1 and 2, a flexible battery 100 according to one embodiment of the present invention may include an electrode assembly 110 and an exterior material 120, and may be formed in a plate shape having a predetermined area. Further, the electrode assembly 110 may be sealed in the exterior material 120 along with an electrolyte.

In this case, in the flexible battery 100 according to one embodiment of the present invention, a plurality of patterns 119 and 124 having ridge portions and groove portions repeatedly formed along a lengthwise direction may be formed.

The plurality of patterns 119 and 124 may be patterns for contraction and relaxation with respect to the lengthwise direction during bending of the flexible battery 100.

Further, the plurality of patterns 119 and 124 may respectively include a first pattern 119 formed on the electrode assembly 110 and a second pattern 124 formed on the exterior material 120, and the first pattern 119 and the second pattern 124 may be formed to match each other.

That is, in the first pattern 119, the ridge portions and the groove portions may be repeatedly formed along the lengthwise direction of the electrode assembly 110, and in the second pattern 124, the ridge portions and the groove portions may be repeatedly formed along the lengthwise direction of the exterior material 120.

Further, in the first pattern 119 and the second pattern 124, the ridge portions and the groove portions may be formed so that the ridge portions may be formed at the same position, and the groove portions may be formed at the same position.

Accordingly, in the flexible battery 100 according to one embodiment of the present invention, the electrode assembly 110 and the exterior material 120 may always behave the same through the first pattern 119 and the second pattern 124, and may be easily curved with a predetermined curvature through the plurality of patterns 119 and 124.

Accordingly, even when the flexible battery 100 according to one embodiment of the present invention returns to an original state thereof from being bent or curved at a predetermined curvature, a length change amount may be offset through the first pattern 119 and the second pattern 124 formed to match each other.

Accordingly, even when the flexible battery 100 according to one embodiment of the present invention is repeatedly bent, or is mounted in a state of curved at a predetermined curvature, an amount of deformation of a base material constituting the electrode assembly 110 and the exterior material 120 may be prevented or minimized through the first pattern 119 and the second pattern 124.

Accordingly, even when the flexible battery 100 according to one embodiment of the present invention is repeatedly bent, or is mounted in the state of curved at the predetermined curvature, since an amount of deformation of the base material which may locally occur in a portion to be curved is minimized, local damage or performance degradation at portions where the electrode assembly 110 and the exterior material 120 are curved may be prevented.

For example, in the first pattern 119 and the second pattern 124, each of the ridge portions and the groove portions may be formed in directions parallel to width directions of the exterior material 120 and the electrode assembly 110. Further, in the first pattern 119 and the second pattern 124, the ridge portions and the groove portions may be alternately formed in the lengthwise directions.

Here, each of the ridge portions and the groove portions may have at least one of an arc-shaped cross-section including a semicircle, a polygonal cross-section including a triangle or a quadrangle, and a shape in which the arc-shaped cross-section and the polygonal cross-section are mutually combined.

Figure 4A:
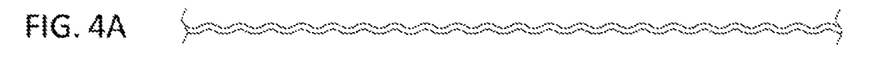
FIGS. 4A-4C illustrate a method of forming patterns in the flexible battery according to one embodiment of the present invention.
Figure 4B:
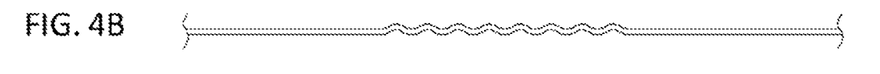
Figure 4C:
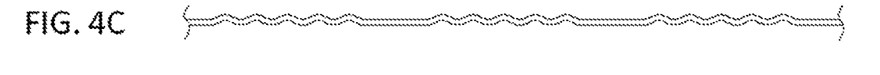

Further, as shown in FIGS. 4A to 4C, the first pattern 119 and the second pattern 124 may be formed over an entire length of the flexible battery 100, or may be partially formed over a part of the entire length of the flexible battery 100.

In this case, in the flexible battery 100 according to one embodiment of the present invention, a maximum bending curvature of a portion which is curved through the plurality of patterns 119 and 124 during bending may be adjusted depending on design conditions.

For example, a maximum bending curvature of a portion which is maximally curved through the plurality of patterns 119 and 124 may be adjusted through a gap L between two neighboring patterns and a depth d of the pattern.

Figure 3:
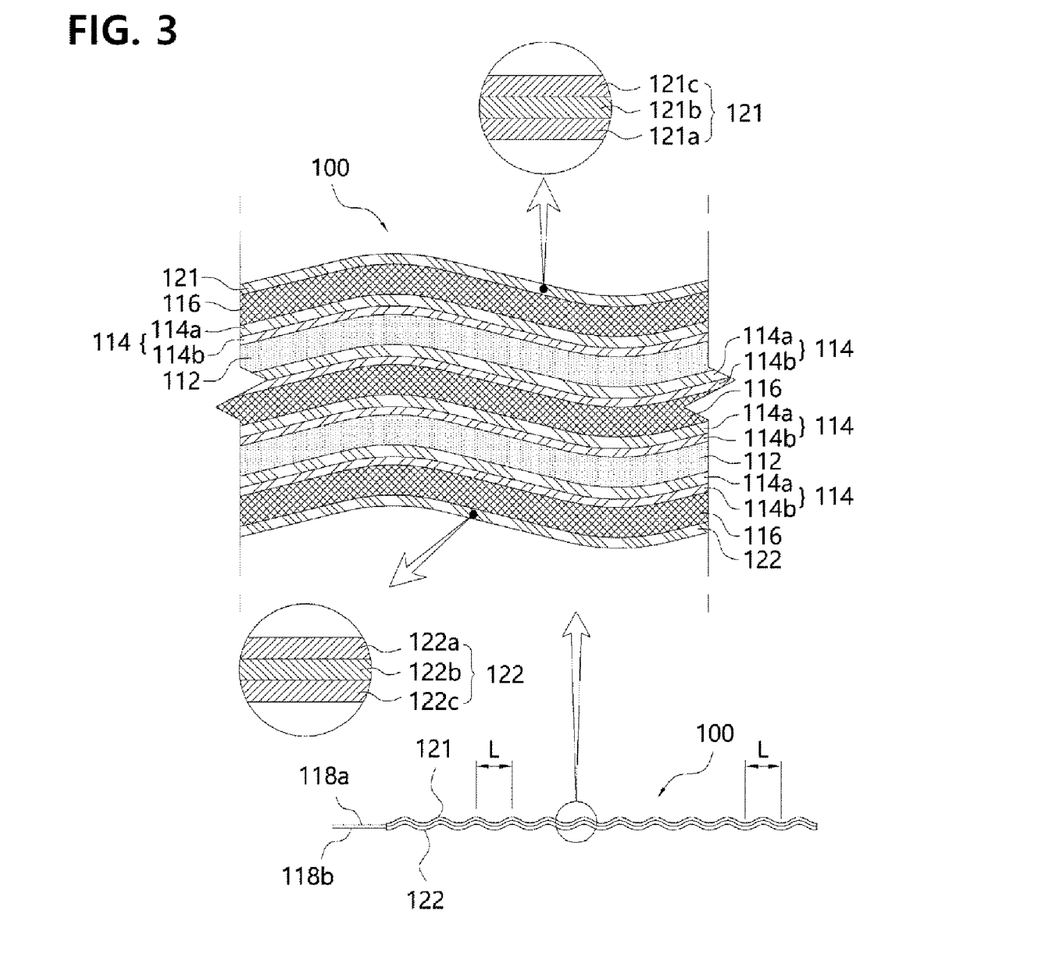
FIG. 3 is an enlarged view of detailed configurations of the flexible battery according to one embodiment of the present invention.
Figure 5A:
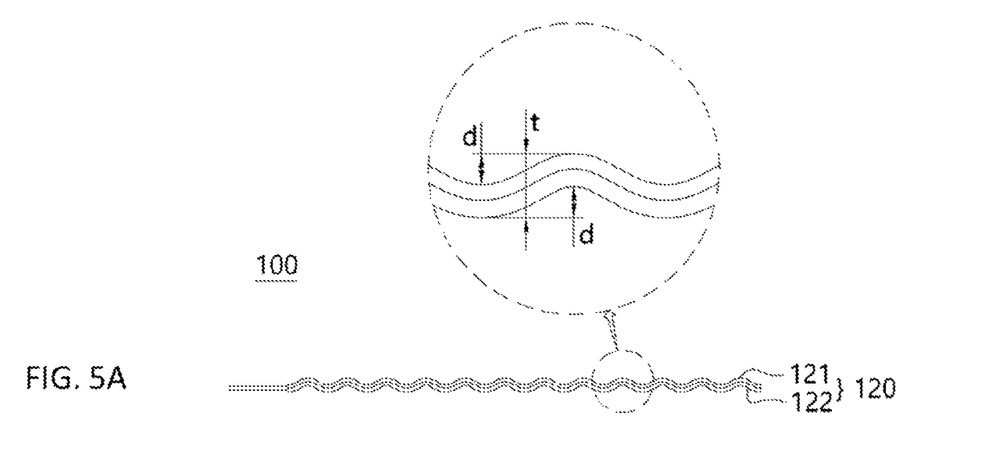
FIGS. 5A-5B illustrate states before and after bending of the flexible battery according to one embodiment of the present invention.

In the present invention, as shown in FIG. 3, the gap L between two neighboring patterns may be a gap between two neighboring ridge portions or a gap between two neighboring groove portions. Further, as shown in FIG. 5A, the depth d of the pattern may be a height difference between the ridge portion and the groove portion formed on the same surface. In addition, as shown in FIG. 5A, an overall thickness t of the flexible battery 100 may be a height difference between the ridge portion and the ridge portion protruding from two surfaces, which are opposite surfaces each other, in opposite directions.

As a non-limiting example, in the flexible battery 100 according to one embodiment of the present invention, a radius of curvature R at a maximum bending curvature of a portion in which the patterns 119 and 124 are formed during bending may satisfy a range from R20 to R95.

That is, in the plurality of patterns 119 and 124, the gap L between two neighboring patterns and the depth d of the pattern may be adjusted so that the radius of curvature R may satisfy the range from R20 to R95.

Figure 5B:
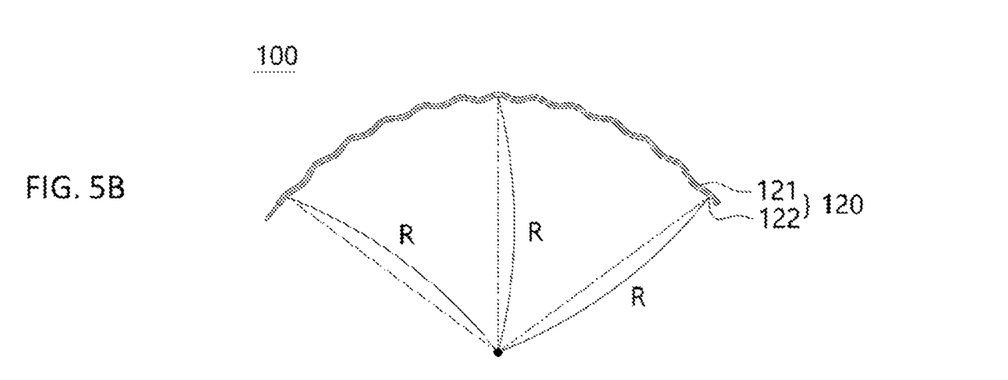

In the present invention, as shown in FIG. 5B, the R20 to the R95 may refer to a radius of curvature R in a maximum bending curvature state which is a state in which the flexible battery 100 is maximally curved through the plurality of patterns 119 and 124 without damage. For example, R60 may mean that the radius of curvature R in the maximum bending curvature state in which the flexible battery 100 is maximally curved through the plurality of patterns 119 and 124 without damage is 60 mm.

Accordingly, the flexible battery 100 according to one embodiment of the present invention may be implemented as a flexible battery always having the same maximum bending curvature during bending regardless of sizes of the overall thickness t and a width W.

That is, in the case in which the plurality of patterns 119 and 124 are formed so that the gap L between the plurality of patterns and the depth d of the pattern respectively have the same values regardless of the overall thickness t and the width W, the flexible battery 100 according to one embodiment of the present invention may always have the same maximum bending curvature regardless of the overall thickness t and the width W even when the overall thickness t becomes thicker or the width W becomes wider.

Accordingly, the flexible battery 100 according to one embodiment of the present invention may be smoothly curved to a maximum desired curvature through the portion in which the plurality of patterns 119 and 124 are formed without degradation in battery performance or damage. Accordingly, since the flexible battery 100 according to one embodiment of the present invention may repeatedly implement as a battery having a maximum bending curvature suitable for the type of product to be applied or a use place, design freedom of the flexible battery may be enhanced.

This may be confirmed in the following Table 1 and Table 2.

TABLE 1

| Classification | Example 1 | Example 2 | Example 3 |
|---|---|---|---|
| width (W) | | 26 mm | |
| overall thickness (t) | 2.1 mm | 2.7 mm | 3.3 mm |
| depth of pattern (d) | | 0.7 mm | |
| radius of curvature at maximum bending curvature(R) | | 35R(=35 mm) | |

TABLE 2

| Classification | Example 4 | Example 5 | Example 6 | Example 7 |
|---|---|---|---|---|
| width (W) | 26 mm | 40 mm | 50 mm | 60 mm |
| overall thickness (t) | | 2.8 mm | | |
| depth of pattern(d) | | 0.7 mm | | |
| radius of curvature at maximum bending curvature(R) | | 35R(=35 mm) | | |

In Examples 1 to 7, the plurality of patterns 119 and 124 matching each other were formed on the electrode assembly 110 and the exterior material 120 using the same gear. Further, the plurality of patterns 119 and 124 formed in each of Examples 1 to 7 were formed so that the gap L between the patterns and the depths d of the patterns 119 and 124 respectively have the same size through the same gear.

Under the same conditions, Examples 1 to 3 are cases in which all widths of the flexible battery 100 are identically 26 mm and the overall thickness t is changed, and Examples 4 to 7 are cases in which all overall thicknesses t of the flexible battery 100 are identically 2.8 mm, and the overall width is changed.

As shown in the above-described Table 1 and Table 2, in the case in which the gap L between two patterns formed adjacent to each other and the depth d of the pattern respectively have the same value even when the overall width or the overall thickness of the flexible battery 100 is changed, it may be confirmed that a radius of curvature R at the maximum bending curvature of the flexible battery 100 which is curved during bending is the same even when the overall thickness t becomes thicker or the width W becomes wider.

Accordingly, regarding the flexible battery 100 according to one embodiment of the present invention, even when having different sizes and various capacitances by varying the overall thickness t by changing a lamination number of a positive electrode 112 and a negative electrode 116 constituting the electrode assembly 110 or the width W of the electrode assembly 110, flexible batteries having different sizes and various capacitances may have the same a radius of curvature R at maximum bending curvature during bending.

Accordingly, while satisfying the same maximum bending curvature or the same radius of curvature R by forming the flexible battery 100 according to one embodiment of the present invention so that the gap L between the patterns is the same and the depth d of each of the patterns is the same, a battery having a large capacitance may be easily implemented by increasing the lamination number of the positive electrode 112 and the negative electrode 116 constituting the electrode assembly 110 to increase the overall thickness t or the width W of the electrode assembly 110.

In other words, the flexible battery 100 according to one embodiment of the present invention may enable easy design of a flexible battery capable of satisfying both an allowable maximum bending curvature and a required high capacitance even when the maximum bending curvature is limited while requiring a high capacitance depending on where the product is used.

Further, since the flexible battery 100 according to one embodiment of the present invention may have various capacitances through a size change such as thickness, width, or the like while having the same the maximum bending curvature, design freedom may be enhanced.

As shown in FIGS. 2 and 3, the electrode assembly 110 may include the positive electrode 112, the negative electrode 116, and a separator 114, and may be sealed inside the exterior material 120 along with the electrolyte.

In this case, the positive electrode 112 may include a positive electrode current collector 112a and a positive electrode active material 112b, the negative electrode 116 may include a negative electrode current collector 116a and a negative electrode active material 116b, and each of the positive electrode current collector 112a and the negative electrode current collector 116a may be implemented in a plate-type sheet shape having a predetermined area.

For example, in the positive electrode 112 and negative electrode 116, the active materials 112b and 116b may be respectively compressed, deposited, or coated on one surface or both surfaces of each of the current collectors 112a and 116a. In this case, the active materials 112b and 116b may be provided over the entire surfaces of the current collectors 112a and 116a, or partially provided over parts of the entire surfaces of the current collectors 112a and 116a.

Further, the positive electrode current collector 112a and the negative electrode current collector 116a may be respectively formed with a negative electrode terminal 118a and a positive electrode terminal 118b for electrical connection from bodies thereof to external devices.

The separator 114 may be disposed between the positive electrode 112 and the negative electrode 116, and may be a non-electron conductive diaphragm capable of preventing a short circuit between the positive electrode 112 and the negative electrode 116.

For example, the separator 114 may include a nanofiber web layer 114b on one surface or both surfaces of a nonwoven fabric layer 114a.

Here, the nanofiber web layer 114b may be a nanofiber containing at least one selected from polyacrylonitrile nanofibers and polyvinylidene fluoride nanofibers.

Further, a composite porous separator may be used as the separator 114 so that impregnation property of a gel polymer electrolyte may be optimized when the gel polymer electrolyte is used as the electrolyte.

That is, the composite porous separator is used as a matrix and may include a porous nonwoven fabric having fine pores and a porous nanofiber web formed of a spinnable polymer material and impregnated with the electrolyte.

Since the positive electrode 112, the negative electrode 116, and the separator 114 are known contents, detailed descriptions will be omitted, and all general contents commonly adopted in the battery may be applied.

The exterior material 120 may be a plate-shaped member having a predetermined area, and may accommodate the electrode assembly 110 and the electrolyte therein. Accordingly, the exterior material 120 may protect the electrode assembly 110 from an external force.

For example, the exterior material 120 may include a pair of first exterior material 121 and second exterior material 122, wherein the first exterior material 121 may cover an upper surface of the electrode assembly 110, and the second exterior material 122 may cover a lower surface of the electrode assembly 110.

Further, in the first exterior material 121 and the second exterior material 122, since edge sides which come into contact with each other are sealed through an adhesive, an inner space which accommodates the electrode assembly 110 and the electrolyte may be formed.

That is, the edge sides among entire areas of the first exterior material 121 and the second exterior material 122 may form a sealing part 126, and the remaining area other than the edges may form an accommodation part 125 which accommodates the electrode assembly 110 and the electrolyte.

Accordingly, since the exterior material 120 may be disposed so that the sealing part 126 may surround the accommodation part 125, the electrolyte may be prevented from leaking from the inner space to the outside.

In this exterior material 120, all edge sides constituting the sealing part may be sealed through the adhesive after the first exterior material 121 and the second exterior material 122 are formed as two members, or other portions which are formed as one member and come into contact with each other after being folded in half along a width direction or lengthwise direction may be sealed through the adhesive.

Meanwhile, the exterior material 120 may have a form in which moisture-proof layers 121b and 122b are interposed between inner resin layers 121a and 122a and outer resin layers 121c and 122c.

For example, the exterior material 120 may have a form in which the inner resin layers 121a and 122a, the moisture-proof layers 121b and 122b, and the outer resin layers 121c and 122c are sequentially laminated, and the outer resin layers 121c and 122c may be exposed surfaces which are exposed to the outside.

That is, the inner resin layers 121a and 122a may be bonded to each other through an adhesive layer in a state in which edge sides are disposed to face each other, and thus may serve as an adhesive member which seals the electrolyte provided inside the battery to prevent leakage to the outside.

These inner resin layers 121a and 122a may be materials of adhesive members commonly provided in an exterior material for a battery, but preferably, may be a polyolefin-based compound, more preferably, propylene and polyethylene, and even more preferably, polypropylene. Further, the polypropylene may include one or more of unmodified polypropylene and acid-modified polypropylene, and specifically, the inner resin layers may have a structure in which the unmodified polypropylene and the acid-modified polypropylene are stacked, but are not limited thereto.

The moisture-proof layers 121b and 122b may be interposed between the inner resin layers 121a and 122a and the outer resin layers 121c and 122c to prevent moisture from penetrating into the battery from the outside and prevent the electrolyte from leaking to the outside.

To this end, a dense metal layer or a polymer film may be used as the moisture-proof layers 121b and 122b to prevent the permeation of moisture and the electrolyte.

For example, in a case in which the moisture-proof layers 121b and 122b are metal layers, the moisture-proof layers 121b and 122b may be foil-like metal thin plates or metal deposition films formed on one surfaces of the outer resin layers 121c and 122c. Preferably, the moisture-proof layers 121b and 122b may be the metal thin plates. As a specific example, the metal layer may include one or more selected from aluminum, copper, phosphor bronze (PB), aluminum bronze, brass, beryllium-copper, chromium-copper, titanium-copper, iron-copper, a Corson alloy, and a chromium-zirconium copper alloy.

Each of the moisture-proof layers 121b and 122b may have an average thickness of 5 μm or more, preferably, 5 μm to 100 μm, and more preferably, 30 μm to 50 μm.

This is because, when the average thickness of each of the moisture-proof layers 121b and 122b is smaller than 5 μm, there is a risk of moisture penetrating into the battery or the electrolyte in the battery leaking to the outside, and specifically, when an external force is applied to the exterior material 120 to create the plurality of patterns 119 and 124, a risk of penetration of the moisture or leakage of the electrolyte increases.

The outer resin layers 121c and 122c may be disposed on one surfaces of the moisture-proof layers 121b and 122b to form the exposed surface of the exterior material 120.

In this case, the outer resin layers 121c and 122c may be formed of a material capable of securing the flexibility and stretchability of the exterior material 120. For example, the outer resin layers 121c and 122c may be formed of a polyamide-based polymer compound, and the polyamide-based polymer compound may include one or more selected from the group consisting of nylon 6, nylon 66, and nylon 12 as a non-limiting example.

Further, the outer resin layers 121c and 122c may not include polyethylene terephthalate (PET), which has been used as an exterior material to reinforce strength and prevent damage due to physical contact in a conventional pouch-type battery.

That is, the flexible battery 100 according to one embodiment of the present invention may secure flexibility and stretchability by using not PET having poor shrinkage or stretchability but rather a polyamide-based polymer compound having flexibility and stretchability as a material of the outer resin layers 121c and 122c constituting the exterior material 120.

Accordingly, in the flexible battery 100 according to one embodiment of the present invention, since the first and second exterior materials 121 and 122 are provided with the outer resin layers 121c and 122c formed of a polyamide-based polymer compound having excellent stretchability even when the electrode assembly 110 has a large thickness, in a process of bonding the edges of the first exterior material 121 and the second exterior material 122, the edge sides may be bonded to each other without any damage or cracks even when excessively bent.

Accordingly, since the flexible battery 100 according to one embodiment of the present invention may form patterns having sufficient depths even when the lamination number of the positive electrode 112 and the negative electrode 116 constituting the electrode assembly 110 is sufficiently increased, a large capacity flexible battery may be implemented. For example, the flexible battery 100 may have a maximum thickness of 4.5 mm or more, and thus may have a large capacitance of 700 mAh or more even in a small size in which a width is 33 mm, and a length is 69 mm.

However, a material of the outer resin layers 121c and 122c is not limited thereto, and any known material which may be commonly used as an exterior material for a battery may be used.

Meanwhile, the flexible battery 100 according to one embodiment of the present invention may further include an adhesive layer between the moisture-proof layers 121b and 122b and the inner resin layers 121a and 122a.

The adhesive layer may serve to enhance adhesion between the moisture-proof layers 121b and 122b and the inner resin layers 121a and 122a, and may prevent corrosion of the moisture-proof layers 121b and 122b from an acidic electrolyte and peeling of the inner resin layers 121a and 122a and the moisture-proof layers 121b and 122b by preventing the electrolyte accommodated in the exterior material from reaching the moisture-proof layers 121b and 122b of the exterior material.

Further, since leakage of the electrolyte is prevented even when a problem such as abnormal overheating or the like occurs during a process of using the flexible battery 100 and thus the flexible battery expands, it is possible to impart reliability for safety.

This adhesive layer may be formed of a material similar to a material forming the inner resin layers 121a and 122a. For example, the adhesive layer may include one or more selected from silicone, polyphthalate, acid modified polypropylene (PPa), and acid modified polyethylene (Pea).

Further, in the flexible battery 100 according to one embodiment of the present invention, a dry lamination layer may be disposed between the moisture-proof layers 121b and 122b and the outer resin layers 121c and 122c.

The dry lamination layer serves to adhere the moisture-proof layers 121b and 122b to the outer resin layers 121c and 122c, and may be formed by drying a known aqueous and/or oily organic solvent type adhesive.

Meanwhile, a commonly used liquid electrolyte may be used as the electrolyte sealed in the accommodation part along with the electrode assembly 110.

For example, an organic electrolyte including a non-aqueous organic solvent and a solute of a lithium salt may be used as the electrolyte. In this case, a liquid electrolyte may be used as the electrolyte used in the flexible batteries 100 and 100' according to the present invention, but preferably, a gel polymer electrolyte may be used. Accordingly, since the flexible batteries 100 and 100' according to the present invention use the gel state polymer electrolyte as the electrolyte, in a case in which a liquid phase is used as the electrolyte of the flexible battery, liquid leakage and leakage which may occur during bending may be prevented.

Although embodiments of the present invention have been described above, the spirit of the present invention is not limited to the embodiments shown in the description, and although those skilled in the art may provide other embodiments through the addition, change, or removal of the components within the scope of the same spirit of the present invention, such embodiments are also included in the scope of the spirit of the present invention.

The invention claimed is:

1. A method for forming patterns of a flexible battery to allow the flexible battery to be curved with a predetermined radius of curvature during bending through a plurality of patterns in which ridge portions and groove portions are repeatedly formed along a lengthwise direction, comprising:
    forming the plurality of patterns on both an electrode assembly and an exterior material of the flexible battery such that the flexible battery has a constant radius of curvature at a maximum bending curvature in a range of R20 to R95 independent of overall width and overall thickness of the flexible battery during bending of the flexible battery, wherein the exterior material is configured to seal the electrode assembly along with an electrolyte, and
    adjusting the radius of curvature to a constant value through a gap (L) between two neighboring patterns and a depth (d) of each of the plurality of patterns.

2. The method of claim 1, wherein:
    the gap (L) is a gap between two neighboring ridge portions or a gap between two neighboring groove portions; and
    the depth (d) is a height difference between a ridge portion and a groove portion formed on a same surface.

3. The method of claim 2, wherein the overall thickness of the flexible battery is a distance between a first ridge portion and a second ridge portion protruding in opposite directions with respect to a virtual center line.

4. The method of claim 1, wherein:
    the plurality of patterns includes a first pattern formed on the electrode assembly and a second pattern formed on the exterior material; and
    the first pattern and the second pattern are formed so as to match each other.

5. The method of claim 1, wherein the maximum bending curvature is a curvature where a portion formed with the plurality of patterns among an entire length of the flexible battery is maximally curved by bending.

* * * * *